Figure 1:
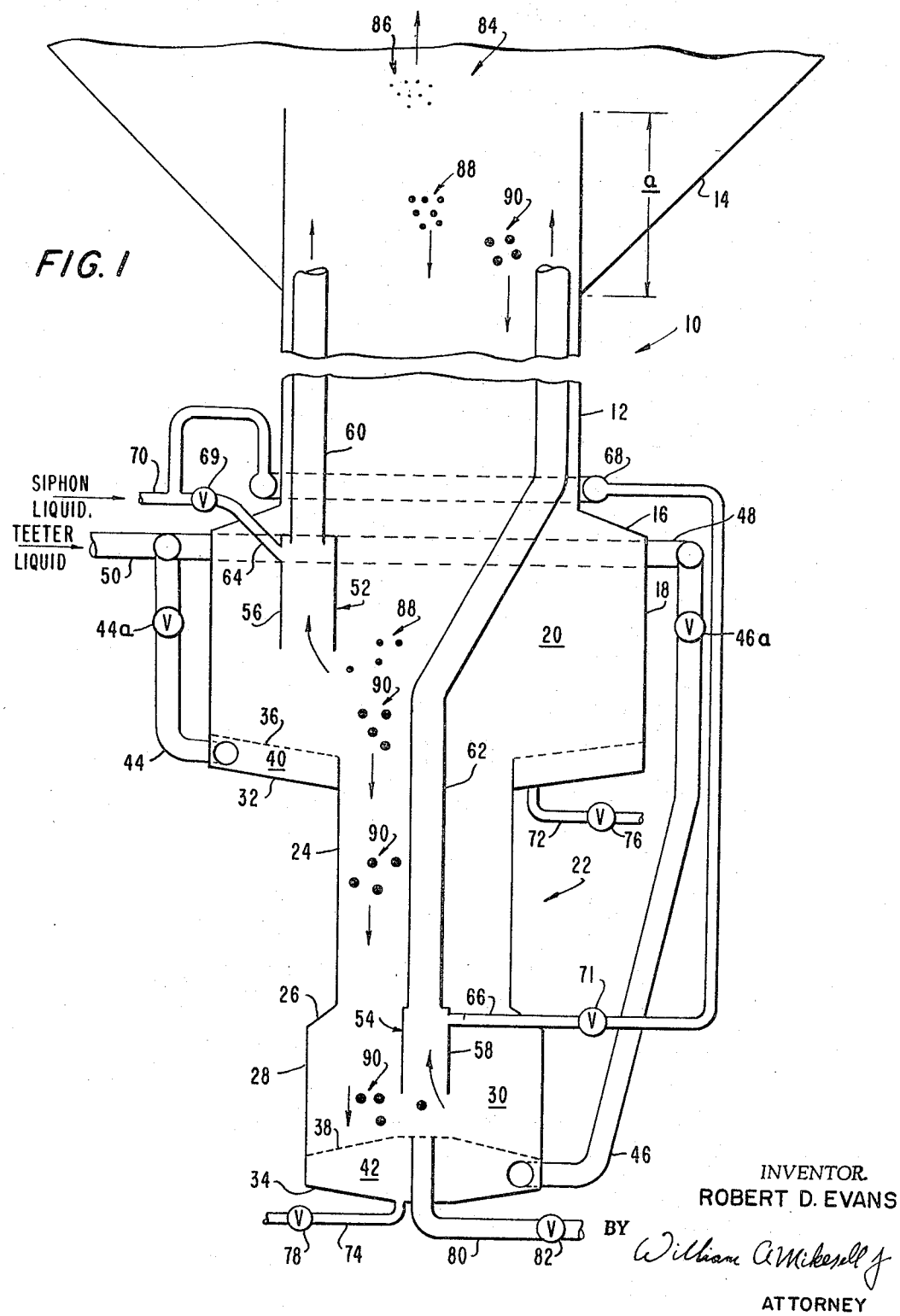

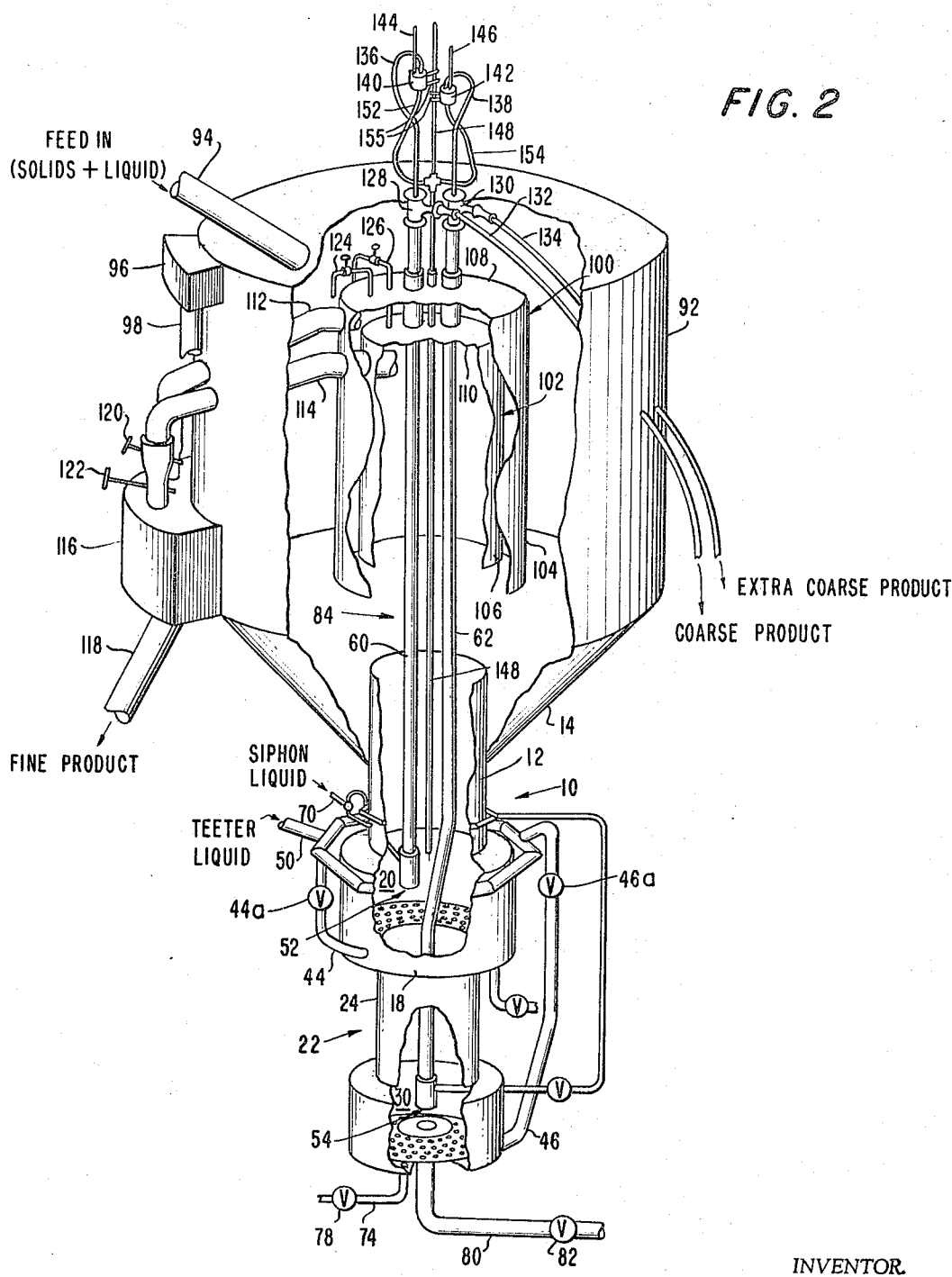

United States Patent Office 3,308,951
Patented Mar. 14, 1967

3,308,951
SECONDARY HINDERED SETTLING COLUMN FOR HYDROSIZERS
Robert D. Evans, Pierce, Fla., assignor to Continental Oil Company, Ponca City, Okla., a corporation of Delaware
Filed Dec. 3, 1964, Ser. No. 415,593
3 Claims. (Cl. 209—158)

This invention relates to the classification of particles according to size, and more particularly to the classification of solid particles employing hydraulic classification techniques.

Solid particles are typically classified through the use of hydraulic sizing equipment in which a liquid slurry of particles of various sizes is applied to a settling tank filled with a liquid and containing a free settling column below which is disposed a hindered settling column. Particles move downwardly within the settling tank to a position beneath the entrance to the free settling column and above the hindered settling column. Lighter ones of the particles are swept upwardly into the free settling column and are discharged as a fine product while heavier ones of the particles enter the hindered settling column and flow downwardly in the column. Within the hindered settling column, the particles are slowed somewhat in their downward movement and assume a state of teeter, i.e., agitation similar to the particle movement in a fluidized bed except that there is a downward drift of particles. The downwardly flowing particles enter a collection chamber at the bottom of the hindered settling column and are removed from the chamber typically through siphon discharges.

In a classification arrangement as described above, it has been observed that larger ones of the particles entering into the collection chamber at the bottom of the hindered settling column tend to accumulate within the chamber and clog the entrances to the siphon discharges. Additional teeter liquid introduced into the collection chamber will activate the bed of larger particles and prevent clogging of the discharges, but at the same time will change the classification characteristics of the system. The change is produced by the increased flow of liquid, which results in a larger minimum size particle passing downwardly through the hindered settling column and concomitantly a larger maximum size particle being swept upwardly into the free settling column and discharged as a fine product.

Accordingly, an object of the present invention is to provide improved hydraulic classification techniques and apparatus.

Another object of the present invention is to provide for the hydraulic classification of solid particles through the use of a hindered settling column wherein the clogging of discharge apparatus is avoided without changing the classification characteristics of the system.

A further object of the present invention is to provide for the hydraulic classification of solid particles through the use of a hindered settling column wherein the clogging of discharge apparatus is avoided and wherein the classification of particles can be such as to provide an additional fraction of product.

These and other objects are achieved in an illustrative embodiment of the present invention which provides hydraulic sizing apparatus that includes primary and secondary hindered settling columns. Briefly, the primary hindered settling column is typically positioned beneath the free settling column in the settling tank of a hydrosizer. The secondary hindered settling column is positioned beneath the primary hindered settling column and is formed with a cross-sectional area smaller than that of the primary column. The settling tank and both columns are filled with a liquid, and additional liquid is applied to both the primary and secondary hindered settling columns at the bottom portions thereof, i.e., to the collection chambers of these settling columns containing the siphon discharges therein. Liquid is thus caused to flow upwardly through the collection chambers and columns. The rates at which liquid is supplied to the bottom portions of the primary and secondary hindered settling columns are chosen so that the upward flow rate of the liquid in the secondary column is greater than the upward flow rate of the liquid in the primary column. As employed herein, the term flow rate is intended to refer to the flow of liquid in terms of volume per unit area per unit time. In other words, the flow rate is the velocity of a unit volume of liquid. Additionally, the collection chambers can be proportioned so that the upward flow rate of liquid in each chamber is less than the flow rate in the corresponding column. Typically, the collection chambers include perforated plates which cause the upwardly flowing liquid to flow in a plurality of streams through the collection chambers and into the columns.

In use, particles to be classified are applied to the settling tank, wherein lighter ones of the particles are swept upwardly into the free settling column and are discharged therefrom as a fine product. Heavier ones of the particles pass downwardly into the primary hindered settling column and into the collection chamber at the bottom of that column. The heaviest ones of such particles, i.e., those particles which do not get drawn out of the collection chamber through the siphon discharges but which may accumulate and clog the siphon discharges in this chamber, pass out of the chamber and downwardly into the secondary hindered settling column and into the collection chamber of that column. These heavy particles are removed from the collection chamber by one or more siphon discharges.

By this arrangement, the secondary hindered settling column prevents clogging of the siphon discharges in the collection chamber of the primary hindered settling column. The flow of liquid in the secondary hindered settling column can be chosen so as not to change the flows in the primary hindered settling column and its collection chamber. Hence the fine product withdrawn from the free settling column and the coarse product withdrawn from the collection chamber of the primary hindered settling column are not changed and remain the same with the addition of the secondary hindered settling column. The secondary hindered settling column, permitting only the largest of the particles to flow downwardly therethrough, can permit a further grade of coarse product to be derived from the collection chamber of that column in those cases in which these largest particles are sufficiently larger than the particles removed from the collection of the primary hindered settling column.

The invention will be more completely understood by reference to the following detailed description, which is to be read in conjunction with the appended drawings, in which:

FIG. 1 is a simplified, somewhat diagrammatic view in vertical section of a representative primary and secondary hindered settling column arrangement in accordance with the invention; and FIG. 2 is a simplified, somewhat diagrammatic view in perspective and partly cut away of a representative hydraulic sizer incorporating the primary and secondary hindered settling column arrangement of FIG. 1.

Referring to FIG. 1, a primary hindered settling column 10 is typically formed from a vertically disposed cylindrical column 12 which extends upwardly into a settling tank 14 shown in the figure as being of frustoconical shape in the region of the primary hindered settling column. The column 12 typically extends upwardly into the tank 14 for a distance designated a, although in some cases involving classification of fine or non-abrasive solids it is desirable to terminate the upper end of the column 12 at the base of the frusto-conical tank section. The bottom portion of the column 12 leads into a frusto-conical section 16 which in turn leads into a vertically disposed cylindrical column 18 that defines a collection chamber 20 that is part of the primary hindered settling column. The cylindrical column 18 defining the collection chamber typically has a larger cross-sectional area than that of the column 12. A secondary hindered settling column 22 is coupled to the bottom of the collection chamber 20 and is defined by a vertically disposed cylindrical column 24 of a cross-sectional area less than that of the column 12. The column 24 leads into a frusto-conical section 26 which in turn leads into a vertically disposed cylindrical column 28 that defines a collection chamber 30 that is part of the secondary hindered settling column. Typically, the cross-sectional area of the column 28 defining the collection chamber 30 is greater than that of the column 24, while being less than the cross-sectional area of the column 18 forming the chamber 20.

The collection chambers 20 and 30 respectively include bottom plates 32 and 34 above which are respectively disposed perforated plates 36 and 38, thereby respectively defining subsidiary chambers 40 and 42 in the collection chambers 20 and 30, respectively. Pipes 44 and 46 respectively lead into the subsidiary chambers 40 and 42 and are joined to a common header 48 connected to an inlet pipe 50. The inlet pipe 50 receives a supply of liquid under pressure which is directed via the pipes 44 and 46 respectively into the subsidiary chambers 40 and 42 to flow upwardly through the perforated plates 36 and 38 in a plurality of streams of liquid. The pipes 44 and 46 respectively includes valves 44a and 46a therein which regulate the flows of liquid to the subsidiary chambers. In use, the hydrosizer arrangement shown is completely filled with liquid, so that the streams of liquid flowing upwardly through the perforations in the plates 36 and 38 act as jets of liquid within the main bodies of liquid filling the collection chambers 20 and 30.

Discharge pipes 52 and 54 are respectively positioned within the collection chambers 20 and 30 and are respectively formed with enlarged bottom sections 56 and 58 which respectively are coupled to upwardly extending pipes 60 and 62. Typically, the discharge arrangements 52 and 54 may be siphon discharges of the type disclosed in my U.S. Patent No. 2,714,958. Such discharges include pipes 64 and 66 which are respectively coupled to the enlarged bottom sections 56 and 58 and which are connected to a common header 68 coupled to an inlet pipe 70. Liquid under pressure is applied to the inlet pipe 70 to flow into the enlarged bottom sections 56 and 58 of the siphon discharges to effect a siphon action to discharge water and material from the collection chambers, as described in Patent No. 2,714,958. Valves 69 and 71 are advantageously included in the pipes 64 and 66, respectively, to control the flow of liquid therethrough.

The collection chambers 20 and 30 each can include more than the single siphon discharges 52 and 54, respectively. Single siphon discharges are shown in each chamber only for the purpose of illustration. Similarly, the chambers 20 and 30 may include more than the single pipes 44 and 46 shown respectively leading into the subsidiary chambers 40 and 42 for supplying liquid thereto. The arrangement shown in FIG. 1 also includes discharge pipes 72 and 74 respectively coupled to the subsidiary chambers 40 and 42 and employed for cleanout purposes. Typically, the pipes 72 and 74 respectively include valves 76 and 78. Additionally, the collection chamber 30 includes an outlet pipe 80 which passes through the perforated plate 38 and which includes a valve 82, all for draining the entire contents of the hydraulic sizing system for maintenance or other reasons. Additionally, the pipe 80 and valve 82 may serve to remove at selected times in case of emergency solid particles which may collect on the perforated plate and which are not withdrawn through the discharge 54.

In operation, the settling tank 14 and the primary and secondary hindered settling columns 10 and 22, which include the collection chambers 20 and 30, are filled with a liquid such as water. Additional liquid is continuously supplied through the inlet pipe 50 to create an upward flow of liquid in the collection chambers 20 and 30 and in the columns 12 and 24, with the upward flow rate in the column 24 being greater than the upward flow rate in the column 12. The upward flow rates of liquid in the columns 12 and 24 are regulated by suitable control of the valves 44a and 46a, respectively. Typically, the flow rate in the column 24 may be roughly two and one half times the upward flow rate in the column 12. Liquid is also continuously supplied to the inlet pipe 70 to effect the siphon action of the discharges 52 and 54 so as to discharge water and material present in the collection chambers 20 and 30. The settling tank 14 is supplied with a slurry of solid particles and liquid of which the particles are to be classified according to size. Within the tank 14, the upward flow of liquid in the region designated 84 above the upper end of the column 12 causes lighter ones of the particles, designated 86 in the figure, to be drawn upwardly for ultimate discharge as a fine product. Heavier ones of the particles, which include particles of an intermediate size designated 88 and still heavier particles designated 90, pass downwardly within the column 12. Within the column, the particles are in a state of teeter. That is, these particles are in agitation, with a movement somewhat similar to the movement of particles in a fluidized bed except that there is a slow downward drift of the particles within the column. The particles in the column 12 enter into the collection chamber 20, at which time their downward velocity increases slightly because of the decrease in the upward flow rate of the liquid within the chamber. This is occasioned because of the larger cross-sectional area of the collection chamber 20 with respect to the cross-sectional area of the column 12. Particles within the collection chamber 20 are subjected to the action of the siphon discharge 52, which removes the intermediate size particles designated 88 as a coarse product.

The largest particles designated 90 are too heavy to function as a part of the fluid bed within the collection chamber 20 and consequently cannot be discharged in their entirety by the siphon discharge 52. Such particles would normally accumulate on the perforated plate 36, building up to a large extent and ultimately clogging the opening of the discharge 52 in the case of a typical hydraulic sizer involving only a single hindered settling column. However, these particles are effectively removed by the secondary hindered settling column 22. The particles enter into the cylindrical column 24 and pass slowly downwardly therein. The upward flow rate of liquid in the column 24 is chosen to be sufficiently great so as to prevent most of the intermediate size particles designated 88 from entering into the column. However, the flow rate is not so great so as to prevent the heaviest particles from flowing downwardly therein. Hence these heaviest particles pass through the column 24 and enter into the collection chamber 30 in which the upward flow rate of liquid is slightly less than the upward flow rate in the column 24. The downward speed of these heavy particles is thus slightly increased, tending to distribute the particles throughout the collection chamber. These particles are withdrawn through the discharge 54 and may serve as an extra-coarse product, if that is desired. Any extremely heavy particles within the collection chamber 30 not withdrawn through the discharge 54 may be removed from the chamber through the outlet pipe 80 at various times by suitable opening of the valve 82.

In the arrangement just described, a fine product is discharged upwardly from the main tank 14, a coarse product is discharged from the discharge 52, and an extra-coarse product is discharged through the discharge 54. Typically, however, the classification desired is a division of particles into only two sizes, namely, a fine particle size and a coarse particle size. The fine product is from the tank 14 and the coarse product is from the discharge 52. The discharge 54, then, simply removes a coarse product too heavy to be discharged through the discharge 52 and which might otherwise cause clogging of that discharge. This product may be crushed and returned to the tank 14 for classification again, if desired.

It will be noted that the secondary hindered settling column 22 removes extra-coarse particles from the collection chamber 20 without changing the classification characteristics of the system. To elaborate, without the secondary hindered settling column 22, an additional flow of liquid would be required in the chamber 20 to maintain the particles therein in a state of agitation to prevent clogging of the discharge 52. This increased flow, however, would change the upward velocity of liquid within the chamber 20 and column 12, thereby changing the classification characteristics of the system. In particular, the smallest particle capable of drifting downwardly within the column 12 would be larger than that previously capable of passing downwardly through the column before the supply of water was increased to avoid clogging. The addition of a secondary hindered settling column to the system overcomes the problem of clogging without changing the classification characteristics of the system, inasmuch as the secondary hindered settling column may be operated without changing the flows of liquid within the primary hindered settling column.

FIG. 2 shows a complete system involving the primary and secondary hindered settling columns shown in FIG. 1. The system of FIG. 2 is representative and is of the type shown in FIG. 4 of my U.S. Patent No. 2,784,841. The frusto-conical tank section 14 leads into a large vertical cylindrical tank 92 to which a liquid slurry containing particles of solid matter to be classified is applied through a feed pipe 94. Tank 92 is filled with a liquid, such as water, as are the primary and secondary hindered settling columns 10 and 22. An overflow launder 96 is provided which includes a discharge pipe 98. Disposed within the settling tank 92 are free settling columns 100 and 102 respectively formed from vertically disposed cylindrical columns 104 and 106 open at the bottom ends thereof and closed at the top ends thereof respectively by plates 108 and 110. Discharge pipes 112 and 114 lead respectively from the free settling columns 100 and 102 to a box 116 from which a pipe 118 leads for discharge of a fine product for further treatment or for disposal. The discharge pipes 112 and 114 include valves 120 and 122, respectively. Also leading into the free settling columns 100 and 102 are pipes 124 and 126, respectively, which pass through the top plates 108 and 110 of the free settling columns. The pipes 124 and 126 are air vents typically controlled by float valves (not shown) governed by the level of the liquid within the settling tank 92 and whose operations are described in my Patent No. 2,784,841.

Upwardly extending siphon discharge pipes 60 and 62 respectively from the collection chambers 20 and 30 respectively pass through the top plates 108 and 110 of the free settling columns and terminate respectively in couplings 128 and 130. Pipes 132 and 134 are connected to these couplings and serve as outlet conduits respectively for a coarse product and an extra-coarse product. The couplings are also connected by tubes 136 and 138 respectively to float chambers 140 and 142. The float chambers are coupled also to the atmosphere by tubes 144 and 146. A hydrostatic pipe 148 extends from the collection chamber 20 upwardly through the tank 14 and is connected by tubes 152 and 154 respectively to the float chambers 140 and 142. The float chambers are mounted on the hydrostatic pipe 148 by mountings 155 which permit vertical adjustment of the float chambers on the pipe.

The float chamber arrangements are each the same as the arrangement shown in my Patent No. 2,714,958, as employed in my Patent No. 2,784,841. In particular, the liquid level in the hydrostatic pipe 148 is responsive to the pressure existing in the collection chamber 20 and governs the application of air from the air tubes 144 and 146 through the float chambers respectively to the couplings 128 and 130 respectively at the tops of the siphon discharge pipes 60 and 62. The arrangement is such as to decrease the siphon discharge in one of these pipes by the application of air to that pipe whenever the pressure in the collection chamber 20 decreases beyond a certain point, indicating a less dense slurry in that collection chamber. By adjusting the positions of the float chambers 140 and 142 on the hydrostatic pipe 148, the pressure in the collection chamber 20 at which the associated one of the discharge pipes 60 and 62 is coupled to the atmosphere may be varied. In this fashion, and by positioning the float chamber 142 below the float chamber 140, the application of air to the discharge pipe 62, although actually responsive to the pressure in the collection chamber 20, may be made effectively responsive to the pressure in the chamber 30. This assumes that the pressure in the chamber 30 is always greater than the pressure in the collection chamber 20 by a fixed amount. This may not always be the case, and hence, if desired, a separate hydrostatic pipe leading from the chamber 30 may be employed to control the application of air through the float chamber 142 to the discharge pipe 62.

In operation, as the liquid slurry containing solids to be classified is applied to the settling tank 92 through the pipe 94, the solids pass slowly downwardly inside the tank outside of the free settling columns 100 and 102. The downward movement is aided by a downward liquid velocity outside the free settling columns caused by liquid moving upwardly within the free settling columns. In particular, the volume of liquid in the free settling columns exceeds the volume of liquid flowing upwardly and out of the primary hindered settling column 10, so that the additional liquid is supplied from the settling tank 92. Drawing this additional liquid from the tank 92 produces a downward flow outside the settling columns.

The particles in the tank 92 pass into the region 84 above the primary hindered settling column 10 and below the entrances to the free settling columns 100 and 102. A sharp increase in velocity (directed upwardly) is experienced within the free settling columns which picks off lighter ones of the particles and carries them upwardly into the free settling columns. The upward velocity in the free settling columns is determined by the valves 120 and 122 which control the outward flow of liquid and particles from the free settling columns. Heavier ones of the particles in the zone 84 not swept upwardly into the free settling columns pass downwardly into the primary hindered settling column 10. The action within the primary hindered settling column 10 and the action within the secondary hindered settling column 22 is as described above in connection with FIG. 1. Namely, coarse particles are withdrawn from the siphon discharge 52 while heavier particles pass downwardly into the secondary hindered settling column 22 and are discharged through the siphon discharge 54.

The system of FIG. 2 provides four different sizes of product. The lightest particles or tailings are removed by overflow into the launder 96. Typically, these particles are so fine as to be of no commercial use and the product may be discharged as waste. The next heavier size of particles is discharged from the free settling columns 100 and 102 respectively through the pipes 112 and 114. This typically constitutes a fine product from the system. Still heavier particles discharged through the siphon discharge 52 in the collection chamber 20 of the primary hindered settling column 10 typically form a coarse product. Finally, the heaviest particles removed from the collection chamber 30 of the secondary hindered settling column 22 through the siphon discharge 54 can constitute an extra-coarse product. The sizes of particles in the different classes of product can be varied by varying the flow rates of the liquid in the system. The relationships with respect to size of the various components of the system, i.e., the sizes of the settling tank 92, the free settling columns 100 and 102, the primary hindered settling column 10 and the secondary hindered settling column 22, determine the classification characteristics of the system insofar as they affect the flow rates of liquid therein.

It will be helpful to give some typical sizes, flow rates and classification characteristics for a hydraulic sizing system such as shown in FIG. 2. The settling tank 92 is typically 20 feet in diameter and 15 feet high measured from the top of the frusto-conical section 14. The free settling columns 100 and 102 are typically 8 feet and 6 feet in diameter, respectively, and 12 feet and 9½ feet long. The column 12 of the primary hindered settling column is typically 7½ feet long and 5 feet in diameter. The distance between the top of the column 12 and the bottom ends of the free settling columns 100 and 102 is typically 4 feet. The collection chamber 20 of the primary hindered settling column is typically 7½ feet in diameter and 4 feet high. The column 24 of the secondary hindered settling column is typically 4½ feet long and 3 feet in diameter. The collection chamber 30 of the secondary hindered settling column is typically 4 feet in diameter and 3 feet high.

The following table tabulates typical flows of liquid and material throughout a hydraulic sizing system of the type shown in FIG. 2 and having the dimensions given above.

TABLE 1

| | Long Tons/hr. of Solids | Percent Solids by Weight | Gal./min. of Water |
|---|---|---|---|
| Feed to tank 92 (feed pipe 94) | 400 | 30 | 4,172 |
| Tank overflow (launder 96) | | | 501 |
| Discharge from free settling columns 100 and 102 (pipe 118) | 267 | 19.4 | 4,971 |

(Total slurry movement of 5,414 gal./min. with a slurry rise velocity of 0.24 ft./sec. in free settling columns 100 and 102)

| | | | |
|---|---|---|---|
| Total discharge from primary and secondary hindered settling columns 10 and 22 (pipes 132 and 134) | 133 | 55 | 487 |
| Discharge from primary hindered settling column 10 (pipe 132) | 106 | 55 | 388 |

(Upward flow of water in column 12 of 1,300 gal./min., i.e., upward rise velocity of 0.1475 ft./sec.)

| | | | |
|---|---|---|---|
| Discharge from secondary hindered settling column 22 (pipe 134) | 27 | 55 | 99 |

(Upward flow of water in column 24 of 1,080 gal./min., i.e., upward rise velocity of 0.340 ft./sec.)

| | | | |
|---|---|---|---|
| Total teeter water (pipe 50) | | | 1,300 |
| Teeter water—primary hindered settling column 10 (pipe 44) | | | 220 |
| Teeter water—secondary hindered settling column 22 (pipe 46) | | | 1,080 |
| Total siphon water (pipe 70) | | | 487 |
| Siphon water—primary hindered settling column 10 (pipe 64) | | | 388 |
| Siphon water—secondary hindered settling column 22 (pipe 66) | | | 99 |

The system normally would be supplied with a feed of particulate material of varying sizes to be classified at a rate of roughly 400 long tons of material per hour. The feed to the tank 92 through the inlet pipe 94 would be in the form of a liquid slurry, the flow typically being 4172 gallons per minute (g.p.m.) of water, in which the particles to be classified constitute 30% by weight. The overflow of liquid from the tank 92 to the overflow launder 96 might be roughly 501 g.p.m. of water. It is not contemplated that appreciable amounts of solid particles to be classified would pass into the overflow launder. The product discharged from the free settling columns 100 and 102, as regulated by the valves 120 and 122, would typically be in the neighborhood of 267 long tons of solids per hour. The discharge would be a liquid slurry, in which the flow of water might be 4971 g.p.m. and the solids might constitute 19.4% by weight. This movement of slurry within the free settling columns 100 and 102 would represent a total slurry movement of 5414 gallons per minute, with a slurry rise velocity of 0.24 ft./sec. within each of the columns for columns having the dimensions given above. Roughly 3046 g.p.m. of slurry would be moved within the column 102 and 2368 g.p.m. of slurry within the column 100 and outside the column 102 to total 5414 g.p.m.

The total product discharged from both the primary and secondary hindered settling columns 10 and 22, respectively, would typically be 133 long tons of solids per hour in a liquid slurry in which the flow of water is roughly 487 g.p.m. In the slurry, the solids would typically constitute 55% by weight. This total discharge of product from the hindered settling columns would be expected to be divided into roughly 106 long tons per hour of solids from the primary column 10 and 27 long tons per hour of solids from the secondary column 22. The flows of water from the discharge lines 132 and 134 would be expected to be 388 g.p.m. and 99 g.p.m., respectively, to form slurries in each of which the solids constitute 55% by weight. It is contemplated that the upward flow of water in the column 12 would be 1300 g.p.m. which gives an upward flow rate or rise velocity of 0.1475 ft./sec. of water in a column of 5 feet diameter as given above. Similarly, the upward flow of water in column 24 would be expected to be roughly 1080 g.p.m., with an upward flow rate or rise velocity of 0.340 ft./sec. in a column of 3 feet diameter as above.

To produce these upward flows of water in the columns 12 and 24, it is expected that the total teeter water supplied to the system by the pipe 50 would be roughly 1300 g.p.m. Of this total amount of teeter water, 1080 g.p.m. would be typically applied to the bottom of the secondary hindered settling column 22 by suitable regulation of valve 46a, while only 220 g.p.m. would be supplied to the bottom portion of the primary hindered settling column 12 by suitable regulation of valve 44a. These flow ratios are expected inasmuch as all the water flowing upwardly in the secondary hindered settling column 22 passes into and flows upwardly within the primary hindered settling column 10.

It is contemplated that a total amount of 487 g.p.m. of siphon water would be supplied to the pipe 70, of which 388 g.p.m. would be supplied to the siphon 52 (FIG. 1) in the primary hindered settling column 10 and 99 g.p.m. would be supplied to the siphon discharge 54 in the secondary hindered settling column 22, by suitable regulation of valves 69 and 71. Normally, all the siphon water would be discharged through the siphon discharges, and hence none would enter into the hindered settling columns to flow upwardly and to change the flow rates therein. Whenever the siphon discharge action is cut off or reduced, however, by virtue of the control exercised by the float chambers 140 and 142 as described above, some of the siphon water may pass into the hindered settling columns and change the flow rates somewhat in the columns. This action, however, is intermittent and has no real effect on the classification characteristics of the system.

The following table tabulates the expected classification characteristics of a system having dimensions, water flow rates and solid particle feed rate as described above for a typical feed of solid particles of various sizes.

limiting. From the description of the invention above, it is apparent that a hydraulic sizing method and apparatus have been set forth, involving the use of primary and secondary hindered settling columns. It is apparent that the

TABLE 2

| Product Applied to System for Classification (feed pipe 94) | | Fine Product from Free Settling Columns 100 and 102 (output pipe 118) Percent Weight | Total Coarse Product from Primary and Secondary Hindered Settling Columns 10 and 22 (output pipes 132 and 134) Percent Weight | Coarse Product from Primary Hindered Settling Column 10 (output pipe 132) Percent Weight | Coarse Product from Secondary Hindered Settling Column 22 (output pipe 134) Percent Weight |
|---|---|---|---|---|---|
| Mesh Size | Percent Weight | | | | |
| >8 | 22.5 | 0 | 52.1 | 47.6 | 70.0 |
| 8 to 10 | 7.3 | 0 | 16.3 | 17.9 | 10.0 |
| 10 to 14 | 5.4 | 0 | 12.5 | 13.6 | 8.0 |
| 14 to 20 | 4.3 | 2.4 | 8.1 | 8.4 | 7.0 |
| 20 to 28 | 4.1 | 5.1 | 4.6 | 5.0 | 3.0 |
| 28 to 35 | 10.0 | 17.0 | 3.4 | 3.8 | 2.0 |
| <35 | 46.4 | 75.5 | 3.0 | 3.7 | 0 |
| Total | 100.0 | 100.0 | 100.0 | 100.0 | 100.0 |

Division of Products:
  Fine product—2 parts.
  Coarse product—1 part.
  Primary hindered settling column—80% of coarse product.
  Secondary hindered settling column—20% of coarse product.

In Table 2, the typical feed material chosen is broken down in the first column of the table into its constituent particles, expressed in terms of mesh size. The second column in the table gives the percentage by weight of each mesh size in the total feed. For example, particles of a size greater than 8 mesh constitute 22.5% by weight of the total feed, while particles smaller than 35 mesh constitute 46.4% by weight of the feed. The third column in the table tabulates for the total fine product discharged from the free settling columns 100 and 102 the expected percentage by weight of each of the different sizes of particles. It is expected that no particles greater in size than 14 mesh would be discharged from these free settling columns. The expected breakdown for particles smaller than 14 mesh is as given in the table. For example, it is expected that particles in the size range 28 to 35 mesh will constitute 17.0% of the total fine product. The largest percentage of particles in the total fine product will be made up of particles of a size smaller than 35 mesh, inasmuch as particles of this size constitute 46.4% of the total feed to be classified.

The fourth column in the table tabulates for the total coarse product discharged from both the primary and secondary hindered settling columns 10 and 22 the expected percentage by weight of each of the different sizes of particles. The fifth and sixth columns tabulate for the primary hindered settling column 10 and the secondary hindered settling column 22, respectively, the expected percentage by weight of each of the different sizes of particles with respect to the total product discharged from the particular column. For example, it is expected that 8.1% of the total coarse product will be made up of particles in the size range 14 to 20 mesh; such particles will constitute 8.4% of the total product discharged from the primary hindered settling column 10 and 7.0% of the total product discharged from the secondary hindered settling column 22.

As given in Table 2, it is expected that the total coarse product taken from the primary and secondary hindered settling columns 10 and 22 will be roughly one third of the total feed supplied to the system, while the fine product derived from the free settling columns 100 and 102 will constitute the remaining two thirds of the total feed. It is further expected that for such a division, the primary hindered settling column 10 will discharge 80% of the total coarse product, while the secondary hindered settling column 22 will discharge the remaining 20% of the total coarse product.

It should be noted that in this description of typical dimensions and liquid and particle flow rates, the figures given are exemplary and are in no way to be taken as limiting. representative embodiment of the invention shown in FIG. 1 and employed in the system of FIG. 2 is subject to being modified by persons skilled in the art. Accordingly, the invention should be taken to be defined by the following claims.

What is claimed is:

1. In apparatus for hydraulically classifying particles having a range of sizes, the combination of a first vertically disposed column, a first chamber positioned beneath the first column of larger cross-sectional area than said first column and communicating therewith, a second vertically disposed column of smaller cross-sectional area than said first column positioned beneath said first chamber and communicating therewith, a second chamber positioned beneath the second column of larger cross-sectional area than said second column and communicating therewith, said columns and said chambers being filled with a liquid, means for separately introducing liquid into each of said first and second chambers at rates such that there is effected an upward flow of liquid through said first and second chambers and through said first and second columns, with the upward flow rate in said second column being greater than the upward flow rate in said first column and with the upward flow rates in said first and second chambers respectively being less than the upward flow rates in said first and second columns, means for applying particles to be classified to the top portion of said first column, and means for separately discharging particles from each of said first and second chambers.

2. In apparatus for hydraulically classifying particles having a range of sizes, the combination of a first vertically disposed column, a first chamber positioned beneath said first column and of a larger cross-sectional area than the cross-sectional area of said first column, a first frusto-conical member connecting the bottom portion of said first column to the top portion of said first chamber, a second column positioned beneath said first chamber and coupled at the top portion thereof to the bottom portion of said first chamber, said second column having a cross-sectional area less than the cross-sectional area of said first column, a second chamber positioned beneath said second column and of a cross-sectional area greater than the cross-sectional area of said second column, a second frusto-conical member connecting the bottom portion of said second column to the top portion of said second chamber, each of said first and second chambers including a subsidiary chamber therein defined at least in part by a perforated member facing upwardly into the chamber, means for applying a liquid under pressure to each subsidiary chamber to cause flows of liquid upwardly through the perforated members into the first and second chambers and upwardly into the columns thereabove, the upward flow rate of liquid in said second column being higher than the upward flow rate of liquid in said first column, and the upward flow rates of liquid in said first and second chambers being respectively less than the upward flow rates of liquid in said first and second columns, means for applying particles to be classified to the top portion of said first column, and means for separately discharging particles from each of said first and second chambers.

3. In a method of hydraulically classifying particles having a range of sizes, the steps comprising providing a first column of liquid and a second column of liquid beneath and leading into the first column of liquid, each column of liquid having a cross-sectional area that is larger at a lower section of the column than at sections above said lower section, applying liquid separately to the first and second columns of liquid at said lower sections thereof to flow upwardly therethrough with the flow rate in the second column of liquid being greater than the flow rate in the first column of liquid and the flow rates in the upper sections of said columns being greater than that in the lower sections thereof, applying particles to be classified to the top portion of the first column of liquid so that depending upon the size of the particles certain particles drift downwardly within the first column of liquid, heavier ones of said certain particles passing into and drifting downwardly within the second column of liquid while lighter ones of said certain particles remain in the first column of liquid, and discharging particles separately from said lower sections of each of said first and second columns of liquid.

References Cited by the Examiner
UNITED STATES PATENTS

| | | | |
|---|---|---|---|
| 1,959,212 | 5/1934 | Miller | 209—160 |
| 2,967,617 | 1/1961 | Evans | 209—158 |
| 3,032,194 | 5/1962 | Evans | 209—158 |

References Cited by the Applicant
UNITED STATES PATENTS

| | | |
|---|---|---|
| 528,975 | 11/1894 | Pike. |
| 2,420,180 | 5/1947 | Laughlin. |
| 3,075,643 | 1/1963 | Delachanal. |

FRANK W. LUTTER, *Primary Examiner.*